(12) United States Patent
Mannava et al.

(10) Patent No.: US 7,204,677 B2
(45) Date of Patent: Apr. 17, 2007

(54) COUNTERING LASER SHOCK PEENING INDUCED BLADE TWIST

(75) Inventors: Seetha Ramaiah Mannava, Cincinnati, OH (US); Todd Jay Rockstroh, Maineville, OH (US); Roger Owen Barbe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 11/171,087

(22) Filed: Jun. 30, 2005

(65) Prior Publication Data

US 2007/0003417 A1    Jan. 4, 2007

(51) Int. Cl.
    *F01D 5/14* (2006.01)
(52) U.S. Cl. ............... 416/241 R; 416/243; 416/248
(58) Field of Classification Search ............... 416/239, 416/243, 242, 248, 241 R; 29/889.2, 889.7; 219/121.68, 121.73
    See application file for complete search history.

(56) References Cited

U.S. PATENT DOCUMENTS

| | | | | |
|---|---|---|---|---|
| 3,850,698 | A | * | 11/1974 | Mallozzi et al. ............ 148/515 |
| 4,937,421 | A | * | 6/1990 | Ortiz et al. ............ 219/121.68 |
| 5,409,415 | A | | 4/1995 | Kawanami et al. |
| 5,492,447 | A | | 2/1996 | Mannava et al. |
| 5,531,570 | A | * | 7/1996 | Mannava et al. ....... 416/241 R |
| 5,591,009 | A | | 1/1997 | Mannava et al. |
| 5,674,328 | A | | 10/1997 | Mannava et al. |
| 5,674,329 | A | | 10/1997 | Mannava et al. |
| 5,744,781 | A | | 4/1998 | Yeaton |
| 5,756,965 | A | | 5/1998 | Mannava |
| 5,873,770 | A | | 2/1999 | Hashimoto |
| 5,932,120 | A | | 8/1999 | Mannava et al. |
| 6,215,097 | B1 | | 4/2001 | Mannava |
| 6,220,947 | B1 | | 4/2001 | Wheat et al. |
| 6,852,179 | B1 | | 2/2005 | Toller et al. |

FOREIGN PATENT DOCUMENTS

EP    0 794 264 A1    9/1997

OTHER PUBLICATIONS

European Patent Office, European Search Report w/ Annex, 6 pages.

* cited by examiner

*Primary Examiner*—Ninh H. Nguyen
(74) *Attorney, Agent, or Firm*—William Scott Andes; Steven J. Rosen

(57) ABSTRACT

A method for laser shock peening a gas turbine engine blade includes laser shock peening a thin airfoil of the blade, forming a laser shock induced twist in the airfoil, and altering a root of the blade to counter the laser shock induced twist in the airfoil. The altering may be done after the laser shock peening. The altering may be done before the laser shock peening during casting or forging of the blade or during a machining or broaching procedure which cuts a shape of the root. One embodiment of the altering includes forming the root with an altered root centerline having an altered centerline angle with respect to a predetermined root centerline designed for a non-laser shock peened airfoil of the blade.

20 Claims, 3 Drawing Sheets

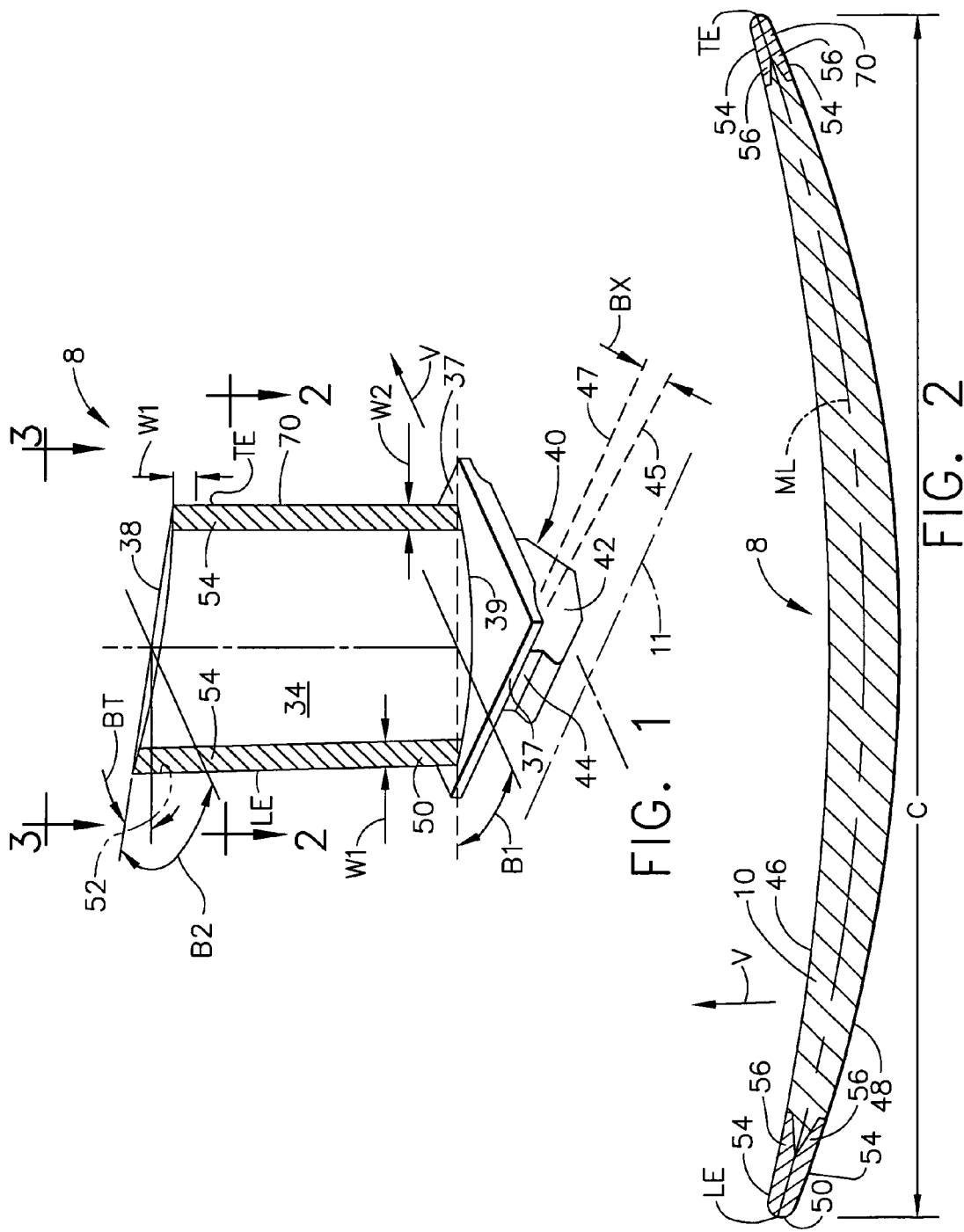

COUNTERING LASER SHOCK PEENING INDUCED BLADE TWIST

BACKGROUND OF THE INVENTION

This invention relates to gas turbine engine rotor blades with leading and trailing edges having localized compressive residual stresses imparted by laser shock peening and, more particularly, to techniques for countering laser shock peening induced twist of the airfoils of these blades.

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shockwave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of the surface. The portion of the surface may have an ablative coating or be bare, meaning having no ablative coating. An explosive force is produced at the impingement point of the laser beam by an instantaneous ablation or vaporization of a thin layer of the material surface or of a coating (such as tape or paint) on the surface which forms a plasma.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

High energy laser beams, from about 20 to about 50 Joules, or low energy laser beams, from about 3 to about 10 Joules, have been used and other levels are contemplated. See, for example, U.S. Pat. No. 5,674,329 (Mannava et al.) issued Oct. 7, 1997 (LSP process using high energy lasers) and U.S. Pat. No. 5,932,120 (Mannava et al.) issued Aug. 3, 1999 (LSP process using low energy lasers). Low energy laser beams can be produced using different laser materials such as neodymium doped yttrium aluminum garnet (Nd YAG), Nd:YLF, and others. Laser shock peening processes typically employ a curtain of water or other confinement liquid medium flowed over the article or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shockwaves into the bulk of the material of a component being LSP'D, to create the beneficial compressive residual stresses.

The LSP process generates deep compressive stresses in the article resulting in improved fatigue strength under foreign object damage (FOD) conditions. LSP improves material properties such as high cycle fatigue, low cycle fatigue, corrosion & erosion resistance. Laser shock peening of leading and/or trailing edges of fan, compressor, and turbine blade airfoils typically includes coating the portion of the edges with an ablative material, such as paint or tape, to provide the material for the plasma. The laser shock peening may be performed on bare or uncoated surfaces. There are associated distortions of thin compressor and turbine blades that alter the profile of the blade and, therefore, may cause substantial aerodynamic problems. These associated distortions are typically an alteration twist of the airfoil of the blades. It is highly desirable to reduce or eliminate this laser shock peened induced twist of the airfoil.

BRIEF DESCRIPTION OF THE INVENTION

A gas turbine engine blade and a method of manufacturing such a blade having at least one laser shock peened surface along the leading and/or trailing edges of an airfoil of the blade and a region of deep compressive residual stresses imparted by laser shock peening (LSP) extending from the laser shock peened surface into the airfoil. The laser shock peened surface extending along at least a portion of the leading and/or trailing edges. The method including altering a root of the blade to counter a laser shock induced twist in the airfoil.

The method for laser shock peening a gas turbine engine blade includes laser shock peening a thin airfoil of the blade, forming a laser shock induced twist in the airfoil, and altering a root of the blade to counter the laser shock induced twist in the airfoil. The altering may be done after the laser shock peening. The altering may be done before the laser shock peening during casting or forging of the blade or during a machining or broaching procedure which cuts a shape of the root. One embodiment of the altering includes forming the root with an altered root centerline having an altered centerline angle with respect to a predetermined root centerline designed for a non-laser shock peened airfoil of the blade.

BRIEF DESCRIPTION OF THE DRAWINGS

FIG. 1 is a perspective view of an exemplary aircraft gas turbine engine blade with an airfoil.

FIG. 2 is a cross sectional view through the airfoil taken along line 2—2 as illustrated in FIG. 1.

DETAILED DESCRIPTION OF THE INVENTION

Figure 3:
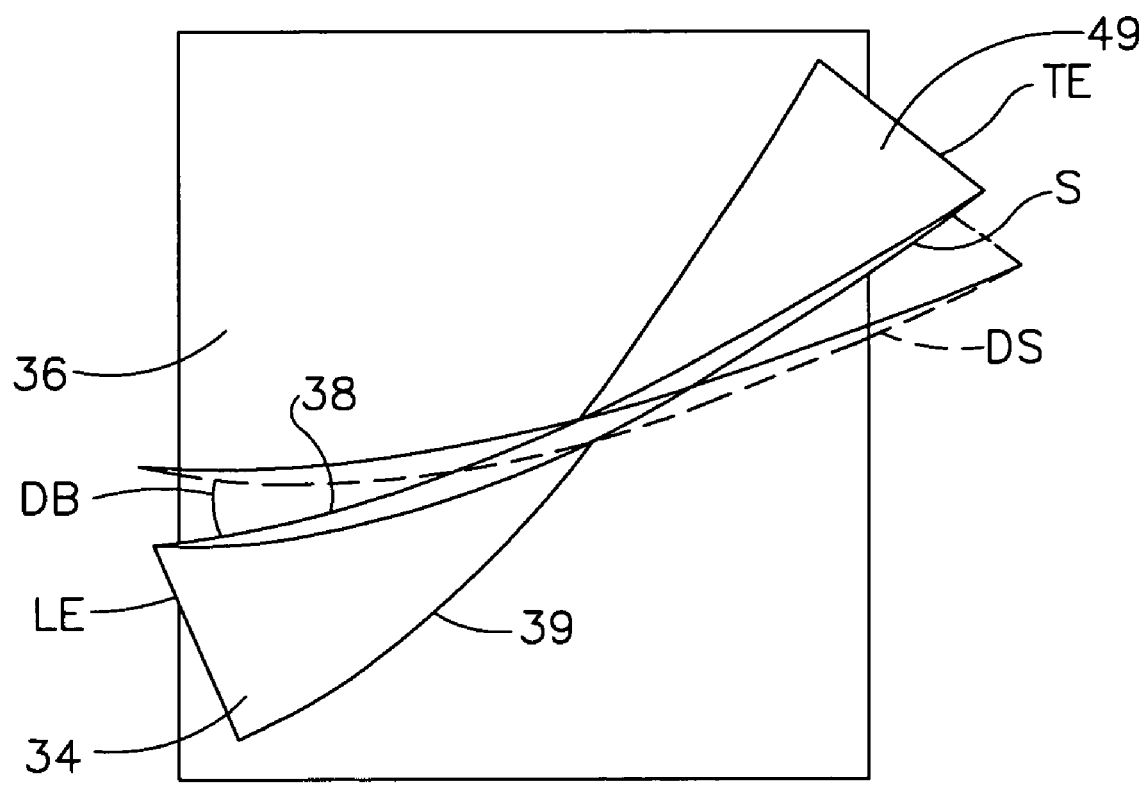
FIG. 3 is a cross sectional view through a tip end section of the airfoil taken along line 3—3 as illustrated in FIG. 2 overlayed with a cross sectional view through a tip end section of a conventional non-laser shock peened airfoil taken along the same line 3—3 illustrated in FIG. 2 illustrating laser shock induced twist of the airfoil.

Illustrated in FIGS. 1, 2, and 3 is a gas turbine engine blade 8 having a thin airfoil 34 made of a Titanium or Nickel based alloy extending radially outward from a blade platform 36 to a blade tip 38. The blade 8 is representative of a compressor or turbine blade with a laser shock peened surface 54 on a metallic substrate 10 of the airfoil 34 along a leading edge LE of the airfoil 34. The blade 8 includes a root section 40 extending radially inward from the platform 36 to a radially inward end 37 of the root section 40. At the radially inward end 37 of the root section 40 is a blade root 42 which is connected to the platform 36 by a blade shank 44. The blade root 42 has a root centerline 45 which is generally parallel to the platform 36, side edges 35 of the platform 36, and the blade shank 44. The roots 42 are shaped to slide into retention slots on a compressor or turbine rotor of the engine.

The airfoil 34 extends in the chordwise direction between the leading edge LE and a trailing edge TE of the airfoil. A chord C of the airfoil 34 is the line between the leading edge LE and trailing edge TE at each cross-section of the blade as illustrated in FIG. 2. A pressure side 46 of the airfoil 34 faces in the general direction of rotation as indicated by an arrow V and a suction side 48 is on the other side of the airfoil and a mean-line ML is generally disposed midway between the two faces in the chordwise direction. The airfoil 34 also has a twist whereby a chord angle varies from a first angle B1 at the platform 36 to a second angle B2 at the tip 38 for which the difference is shown by an angle differential BT. The chord angle is defined as the angle of the chord C with respect to a gas turbine engine or rotor centerline 11, the blade 8 being designed for use in a corresponding gas turbine engine.

The blade 8 has leading and trailing edge sections 50 and 70 that extend along the leading and trailing edges LE and TE, respectively, of the airfoil 34 from the blade platform 36 to the blade tip 38. The leading and trailing edge sections 50 and 70 includes first and second widths W1 and W2, respectively, such that the leading and trailing edge sections 50 and 70 encompass nicks 52 that may form, indicated in phantom line, and tears that may occur along the leading and trailing edges of the airfoil 34. The airfoil 34 is subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the airfoil along possible crack lines that can develop and emanate from the nicks and tears, one or both of the pressure side 46 and the suction side 48 are laser shock peened forming the laser shock peened surfaces 54 with a pre-stressed region 56 having deep compressive residual stresses imparted by laser shock peening (LSP) extending into the airfoil 34 from the laser shock peened surfaces 54 as seen in FIG. 2. The pre-stressed regions 56 are illustrated as being co-extensive with the leading and trailing edge sections 50 and 70 in the chordwise direction to the full extent of widths W1 and W2 and are deep enough into the airfoil 34 to coalesce for at least a part of the widths. The pre-stressed regions 56 are shown co-extensive with the leading edge section 50 in the radial direction along the leading edge LE but may be shorter. The laser beam shock induced deep compressive residual stresses in the compressive pre-stressed regions 56 are generally about 5–150 KPSI (Kilo Pounds per Square Inch) extending from the laser shock peened surfaces 54 to a depth of about 20–50 mils into the compressive pre-stressed regions 56.

The coating or the bare metal of the metallic substrate 10 is ablated generating plasma which results in shockwaves on the surface of the material. These shockwaves are redirected towards the laser shock peened surface 54 by a clear liquid confining medium such as a curtain of water, or a confining layer, to generate travelling shockwaves (pressure waves) in the material below the laser shock peened surface 54. The amplitude and quantity of these shockwave determine the depth and intensity of compressive stresses.

Compressor and turbine blades 8 have airfoils 34 that are generally very thin and laser shock peening the airfoil 34 to form the laser shock peened surfaces 54 and associated pre-stressed regions 56 with deep compressive residual stresses as disclosed above can cause airfoil distortion in the form of a laser shock induced twist DB in the airfoil 34 as illustrated in FIG. 3. The laser shock induced twist DB is generally thought to be caused by the curling of the airfoil due to the deep compressive stresses imparted by the laser shock peening process. The laser shock induced twist DB is distributed along the airfoil's edges going from 0 at a base 39 of the airfoil 34 at the platform 36 to a maximum at the tip 38. The laser shock induced blade twist DB has a cumulative effect on local airfoil aerodynamics from the platform 36 of the airfoil to its tip 38 or any portion thereof. The laser shock induced blade twist DB is illustrated as a blade twist distortion between a designed airfoil cross-sectional shape S (of a non-laser shock peened airfoil 49) drawn with a solid line and a distorted shape DS drawn with a dashed line.

To counter the laser shock induced blade twist DB, the root 42 is altered to change the overall twist of the airfoil as compared to a predetermined or design twist of a non-laser shock peened airfoil 49. The root 42 may be altered by machining such as by a broaching procedure to form the root 42 and blade shank 44, if the blade has one, to change the root centerline 45 by angling the root 42 and the root centerline 45 to form an altered root centerline 47 of an altered root 43 having an altered centerline angle BX between the original root centerline 45 and the altered root centerline 47. The original root centerline 45 being a pre-determined root centerline designed for a blade 8 with an undistorted or non-laser shock peened airfoil 49 of the blade. The altered centerline angle BX should be in a range of about 0.5–1 degree. The altering may be done before the laser shock peening during casting or forging of the blade 8 or during a machining or broaching procedure which cuts a shape of the root 42 after casting or forging.

Figure 4:
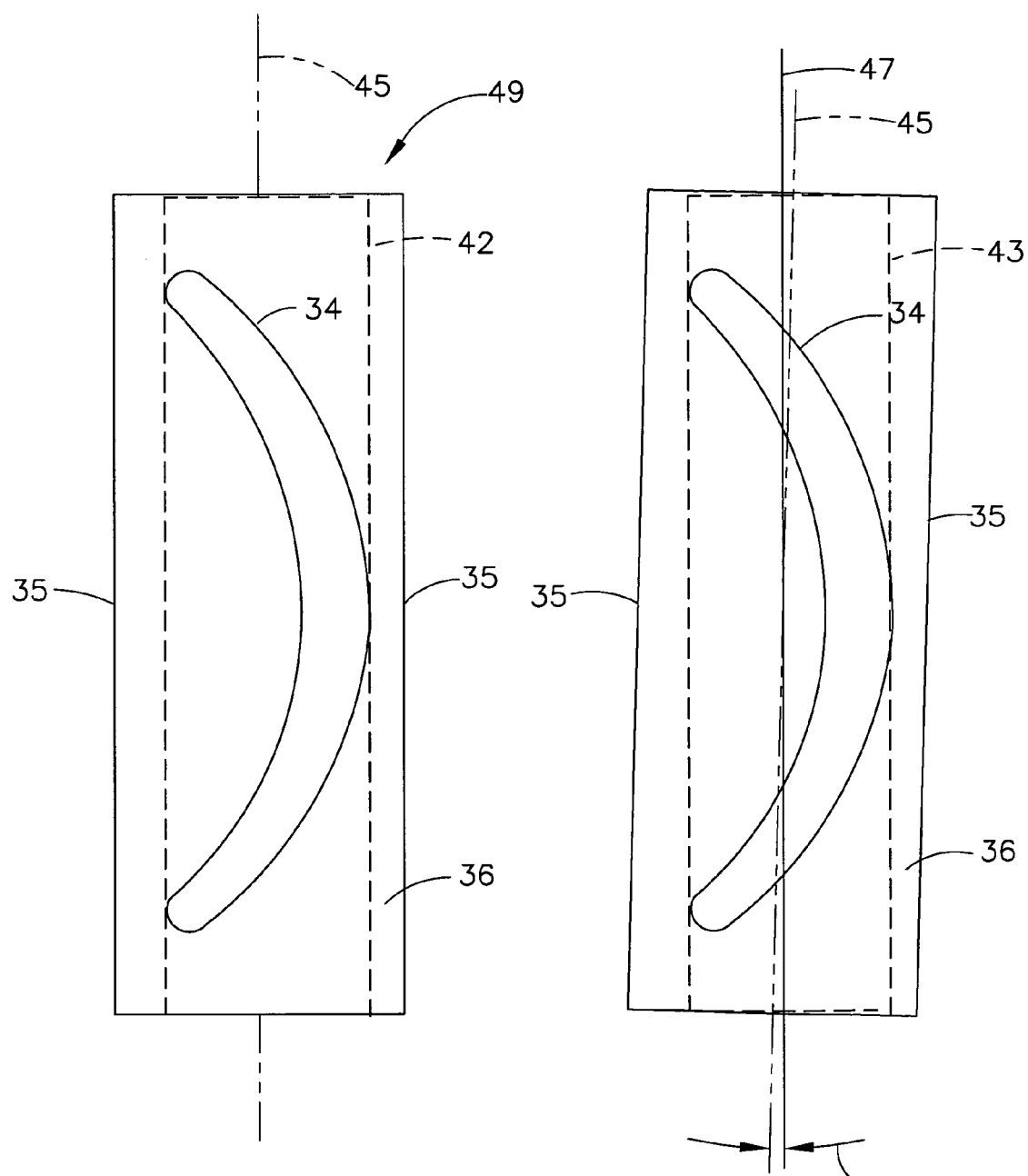
FIG. 4 is a cross sectional view comparison of the blades and airfoils at a base of the airfoils before and after altering a root section of the blade to counter laser shock induced twist of the airfoil.

The altered root centerline 47 of the altered root 43 is illustrated in FIG. 4 as not being parallel to the side edges 35 of the platform 36 but because the altered centerline angle BX is in a range of about 0.5–1 degree there is only a small angling of the platforms 36. Adjacent platforms 36 of adjacent blades 8 will remain parallel and the altering of the root 42 will not interfere with the mechanical fit of the blades and the fit of the roots 42 into the retention slots on the compressor or turbine rotor of the engine.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method for laser shock peening a gas turbine engine blade, the method comprising:
   laser shock peening a thin airfoil of the blade,
   forming a laser shock induced twist in the airfoil, and
   altering a root of the blade to counter the laser shock induced twist in the airfoil.

2. A method as claimed in claim 1 wherein the altering is done before the laser shock peening.

3. A method as claimed in claim 2 wherein the altering is done during casting or forging of the blade.

4. A method as claimed in claim 2 wherein the altering is done during machining of the root after casting or forging of the blade.

5. A method as claimed in claim 1 wherein the altering includes forming the root with an altered root centerline having an altered centerline angle with respect to a predetermined root centerline designed for a non-laser shock peened airfoil of the blade.

6. A method as claimed in claim 5 wherein the altering is done before the laser shock peening.

7. A method as claimed in claim 6 wherein the altering is done in casting or forging of the blade.

8. A method as claimed in claim 6 wherein the altering is done during machining of the root after casting or forging of the blade.

9. A method for laser shock peening a gas turbine engine blade, said method comprising the following steps:
  laser shock peening along a leading edge on at least one of a pressure side and a suction side of a thin airfoil of the blade,
  the laser shock peening forming a laser shock peened surface extending radially along at least a portion of the leading edge and extending chordwise from the leading edge,
  the laser shock peening forming a region having deep compressive residual stresses imparted by the laser shock peening extending into the airfoil from the laser shock peened surface,
  forming a laser shock induced twist in the airfoil, and
  altering a root of the blade to counter the laser shock induced twist in the airfoil.

10. A method as claimed in claim 9 wherein the altering is done before the laser shock peening.

11. A method as claimed in claim 10 wherein the altering is done in casting or forging of the blade.

12. A method as claimed in claim 10 wherein the altering is done during machining of the root after casting or forging of the blade.

13. A method as claimed in claim 9 wherein the altering includes forming the root with an altered root centerline having an altered centerline angle with respect to a predetermined root centerline designed for a non-laser shock peened airfoil of the blade.

14. A method as claimed in claim 13 wherein the altering is done before the laser shock peening.

15. A method as claimed in claim 14 wherein the altering is done in casting or forging of the blade.

16. A method as claimed in claim 14 wherein the altering is done during machining of the root after casting or forging of the blade.

17. A gas turbine engine blade comprising:
  a thin metallic airfoil having a leading edge and a trailing edge and extending away from a root of the blade,
  at least one laser shock peened surface on at least one side of the airfoil of at least one of the leading and edge trailing edges,
  the laser shock peened surface extending radially along at least a portion of and extending chordwise from the one of the edges,
  a region having deep compressive residual stresses imparted by laser shock peening (LSP) extending into the airfoil from the laser shock peened surface,
  a laser shock induced twist in the airfoil, and
  an alteration of the root compared to a root designed for a non-laser shock peened airfoil edge to counter the laser shock induced twist in the airfoil.

18. A blade as claimed in claim 17 wherein the alteration includes the root having an altered root centerline with an altered centerline angle with respect to a predetermined root centerline designed for a non-laser shocked airfoil of the blade.

19. A blade as claimed in claim 18 wherein the alteration was formed during casting or forging of the blade.

20. A blade as claimed in claim 19 wherein the alteration was formed during machining of the root after casting or forging of the blade.

* * * * *